No. 744,322. PATENTED NOV. 17, 1903.
A. DE W. FOOTE.
PROCESS OF PREPARING CONCENTRATING SURFACES.
APPLICATION FILED APR. 9, 1903.
NO MODEL.

Witnesses,
Inventor,
Arthur D. W. Foote
By Geo. H. Strong
Atty.

No. 744,322. Patented November 17, 1903.

UNITED STATES PATENT OFFICE.

ARTHUR DE WINT FOOTE, OF GRASS VALLEY, CALIFORNIA.

PROCESS OF PREPARING CONCENTRATING-SURFACES.

SPECIFICATION forming part of Letters Patent No. 744,322, dated November 17, 1903.

Application filed April 9, 1903. Serial No. 151,776. (No specimens.)

*To all whom it may concern:*

Be it known that I, ARTHUR DE WINT FOOTE, a citizen of the United States, residing at Grass Valley, county of Nevada, State of California, have invented an Improvement in Processes of Preparing Concentrating-Surfaces; and I hereby declare the following to be a full, clear, and exact description of the same.

My invention consists of a process of preparing a surface for concentrating and collecting the mineral contents of tailings or wastes from mills or factories; and it consists in commingling petroleum and lime and spreading the same evenly over the surface of a concentrator.

Figure 1:
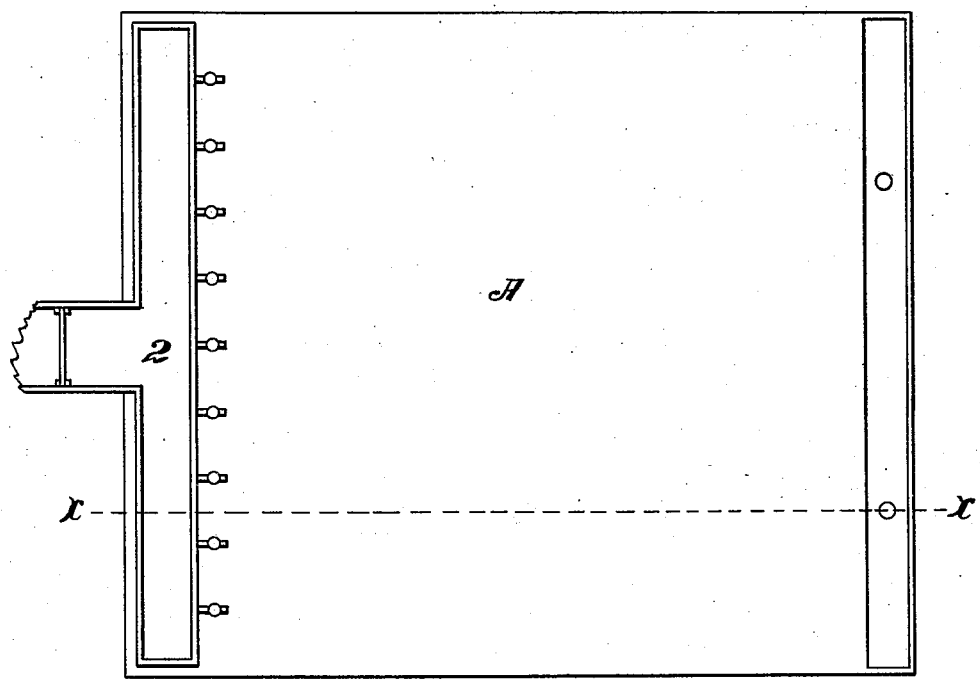
Figure 2:
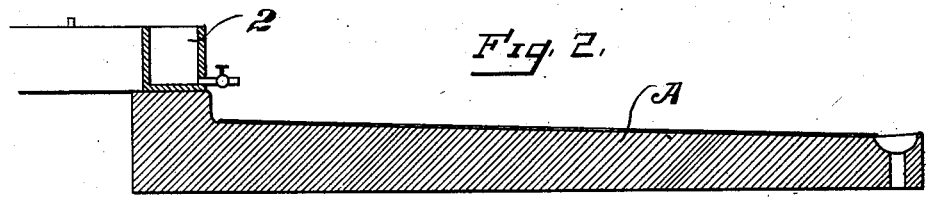

Referring to the accompanying drawings, Figure 1 is a plan of a concentrator to which my process is applied. Fig. 2 is a vertical transverse section of same on line $x\ x$.

For the purpose of accomplishing my object I employ a rectangular or equivalent surface of any suitable size, as ten by twelve feet. This surface may be made of cement, mortar, or other suitable material and is horizontal transversely, but may have a slope in one direction sufficient for the material to flow properly over it. This slope may conveniently be as much as five-eighths of an inch to the foot. On the surface of this table I spread a thin layer of oily soap or a material which may be called either an oil, a soap, or a grease. This material may be conveniently made of crude petroleum and slaked lime or lime-water and produces a viscous substance of such consistency as not to be carried away by the slow current of water and sand running over it and at the same time too oily to be dissolved by the water. Along the upper side of this table A is a suitable distributing-trough 2, and the tailings from the quartz-mill are delivered from this trough, so as to be spread upon the table, making a continuous running film across it. The particles of mineral coming in contact with the viscid substance are retained by it, while the sand or waste material is carried away by the water. When the viscid surface becomes loaded with mineral, the tailings are turned away and the mineral and grease cleaned off the surface. Another layer of the grease or a viscid surface is then put over the table and the tailings turned on and the operation repeated. By this means the viscid surface will catch and hold the particles of mineral in a manner somewhat similar to that by which quicksilver will retain particles of gold, except that the particles held by this viscid surface are not dissolved or united with the material, as in the case of the quicksilver and gold.

Having thus described my invention, what I claim, and desire to secure by Letters Patent, is—

The process of preparing a concentrating-surface consisting in commingling petroleum and lime, and spreading the same evenly over the surface of a concentrator.

In witness whereof I have hereunto set my hand.

ARTHUR DE WINT FOOTE.

Witnesses:
   C. E. CHILDS,
   EDWARD P. FITZSIMMONS.